United States Patent
Quennesson et al.

(10) Patent No.: US 9,286,228 B2
(45) Date of Patent: *Mar. 15, 2016

(54) FACILITATING CACHING IN AN IMAGE-PROCESSING SYSTEM

(71) Applicant: Apple Inc., Cupertino, CA (US)

(72) Inventors: Kevin Quennesson, San Francisco, CA (US); Pierre-Olivier Latour, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 655 days.

This patent is subject to a terminal disclaimer.

(21) Appl. No.: 13/625,774

(22) Filed: Sep. 24, 2012

(65) Prior Publication Data

US 2013/0141450 A1   Jun. 6, 2013

Related U.S. Application Data

(63) Continuation of application No. 11/811,116, filed on Jun. 8, 2007, now Pat. No. 8,274,520.

(51) Int. Cl.
    G09G 5/36    (2006.01)
    G06F 12/08   (2006.01)
    G06T 1/60    (2006.01)
    G09G 5/06    (2006.01)
    G09G 5/12    (2006.01)

(52) U.S. Cl.
    CPC .............. *G06F 12/0875* (2013.01); *G06T 1/60* (2013.01); *G09G 5/06* (2013.01); *G09G 5/12* (2013.01); *G09G 2360/121* (2013.01)

(58) Field of Classification Search
    None
    See application file for complete search history.

(56) References Cited

U.S. PATENT DOCUMENTS

| | | | | |
|---|---|---|---|---|
| 5,475,840 A * | 12/1995 | Nelson et al. | ................. | 719/331 |
| 6,154,811 A * | 11/2000 | Srbljic et al. | ................. | 711/118 |
| 6,907,501 B2 * | 6/2005 | Tariq et al. | .................... | 711/118 |
| 6,957,294 B1 * | 10/2005 | Saunders et al. | ................. | 711/4 |
| 7,000,072 B1 * | 2/2006 | Aisaka | ................. | G06F 12/084 707/999.202 |
| 8,274,520 B2 | 9/2012 | Quennesson et al. | | |
| 2002/0126545 A1 * | 9/2002 | Warren | ............ | G06F 17/30457 365/200 |
| 2006/0259783 A1 | 11/2006 | Work et al. | | |
| 2008/0028156 A1 * | 1/2008 | Fields | ................. | G06F 11/1064 711/141 |

* cited by examiner

*Primary Examiner* — Phi Hoang
(74) *Attorney, Agent, or Firm* — Fish & Richardson P.C.

(57) ABSTRACT

Embodiments of the present invention provide a system for performing caching in an image-processing system. The system starts by receiving a filtering query for resources in a cache. The system then returning a subcache in response to the filtering query. Upon receiving a resource query for resources in the subcache, the system performs the filtering query on the cache, populates the subcache with addresses of resources returned by the filtering query until the resource query is satisfied, and returns available resources from the subcache in response to the resource query.

18 Claims, 7 Drawing Sheets

FACILITATING CACHING IN AN IMAGE-PROCESSING SYSTEM

BACKGROUND

1. Field of the Invention

Embodiments of the present invention relate to techniques for image processing. More specifically, embodiments of the present invention relate to a technique for providing caching in an image-processing system.

2. Related Art

Dramatic advances in computing technology have made it possible for computer systems to efficiently perform image-processing operations on large digital images. Such image-processing operations can involve: converting images from one file format to another, transforming images, or otherwise modifying the images. For example, an image can be converted from a frame of video encoded in an initial color-space into a cropped and reduced-size still image encoded in a different color-space. Additionally, an image can be converted from an abstract image representation (such as in equation form) into a concrete image representation (e.g., a set of bits representing the pixels that comprise the image) during an image-processing operation.

Unfortunately, developers who want to process images often have to use a number of different graphics technologies (i.e., low-level image processing software) to perform the specific operations which are required to complete a given image-processing task. In the example described above, the developer may have to use one graphics technology to extract a frame from a video to produce a still image, while another graphics technology is used to convert the image between color-spaces, and yet another graphics technology is used to transform the image.

Some developers have developed graphics technologies that provide large numbers of image-processing features so that developers are not forced to use multiple graphics technologies to perform a given image-processing task. These graphics technologies often perform certain types of image-processing operations well, but cannot perform other types of image-processing tasks because they are hindered by proprietary formats or do not support all the necessary operations. Furthermore, graphics technologies from different developers typically do not share a common interface, which can make it difficult to automate image-processing tasks which require more than one graphics technology.

Another difficulty with using these graphics technologies relates to the promulgation of new image representation types and/or image-processing steps. If a developer wants to perform an operation that was not available when a graphics technology was released or if the developer wants to perform an existing operation on a new image representation type, the developer can again be forced to rely on multiple graphics technologies.

Hence, what is needed is a system that provides mechanisms for processing images without the above-described problems.

Table 1 presents a listing of support classes within QC Image System in accordance with embodiments of the present invention.

Table 2 presents a listing of default image providers within QC Image System in accordance with embodiments of the present invention.

Table 3 presents a listing of default image converters within QC Image System in accordance with embodiments of the present invention.

Table 4 presents a listing of default image exporters within QC Image System in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), or solid-state devices, such as flash memory, or other volatile and non-volatile storage mediums.

Quartz Technologies Environment

Embodiments of the present invention leverage the Quartz Technologies graphics and windowing environment ("Quartz") distributed by Apple, Inc. of Cupertino, Calif. Hence, in the following sections, we refer to data types and applications that are part of Quartz.

Within Quartz, "Quartz 2D" is a two-dimensional drawing API that allows developers to achieve many visual effects (e.g., translucency and drop shadows), while "Quartz Composer" (QC) is a technology and development tool for processing and rendering graphical data. In addition, Core Image and Core Video support image-processing and video image manipulation, respectively. Quartz also provides low-level system services such as window buffering and composition, event handling and dispatch, display management, and text rendering.

Although we describe embodiments of the present invention that leverage Quartz, an alternative embodiment can function as a standalone system for managing image-processing operations using the same principles.

Computer System

Figure 1:
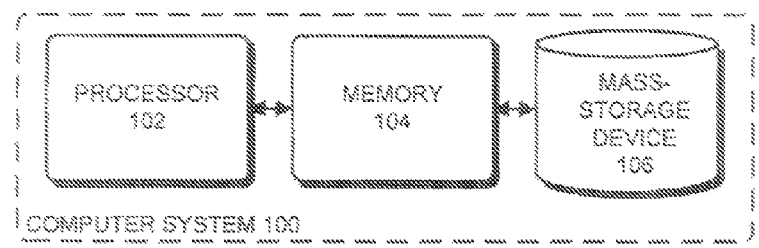
FIG. 1 presents a block diagram of a computer system in accordance with embodiments of the present invention.

FIG. 1 presents a block diagram of a computer system 100 in accordance with embodiments of the present invention. Computer system 100 includes processor 102, memory 104, and mass storage device 106. In some embodiments of the present invention, computer system 100 is a general-purpose computer that is used to manage the processing of images, image-based content, and image representations.

Processor 102 can be a central processing unit (CPU) that processes instructions for computer system 100. For example, processor 102 can be a microprocessor, a controller, an ASIC, or another type of computational engine. Memory 104 is volatile memory that stores instructions and data for processor 102. For example, memory 104 can be DRAM, SDRAM, or another form of volatile memory. Mass storage device 106 is a non-volatile storage device that stores instructions and data for processor 102. For example, mass storage device 106 can be a hard disk drive, a flash memory, an optical drive, or another non-volatile storage device.

Note that although we describe embodiments of the present invention using computer system 100, alternative embodiments can use other types of computing devices.

QC Image System

Figure 2:
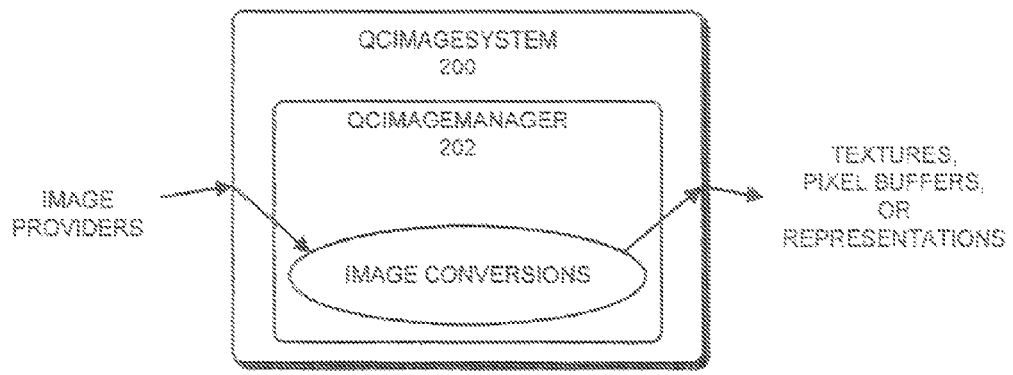
FIG. 2 presents a high-level block diagram of the QC Image System in accordance with embodiments of the present invention.

FIG. 2 presents a high-level block diagram of the QC Image System 200 in accordance with embodiments of the present invention. QC Image System 200 converts images for clients (e.g., the operating system and/or other applications) on computer system 100 (see FIG. 1). As shown in FIG. 2, QC Image System 200 accepts input images from image sources, performs conversions on the images, and then exports GPU buffers (e.g., OpenGL textures), or CPU buffers, and/or image representations of the converted images.

In some embodiments of the present invention, QC Image System 200 is incorporated with the operating system on computer system 100. In alternative embodiments, some or all of QC Image System 200 is incorporated with a standalone application that executes on computer system 100.

In some embodiments of the present invention, QCImageManager 202 handles buffer management, data conversion, uploads/downloads, and caching for QC Image System 200.

In some embodiments of the present invention, the image sources include graphics technologies or APIs such as Core Image (CI), Core Graphics (CG), Core Video (CV), Core Text (CT), NSImage, and/or any other graphics technologies or APIs that provide image representations to QC Image System 200.

In some embodiments of the present invention, the conversions can involve pixel format changes, cropping (including non-rectangular cropping), geometric transformations, and/or color matching. For example, an output image may be a cropped and rotated version of an original image in a different color space, a different pixel format (floating point or integer pixel components), or a different color model (RGB, CMYK, or intensity).

In some embodiments of the present invention, the output image representation types can include the image representation types used by: Core Image, Core Graphics, Core Video, and/or another graphics technology that accepts a predetermined image representation type.

If QC Image System 200 does not support a given input or export image representation type, QC Image System 200 can be configured to recognize the image representation type by adding providers and/or exporters (as described in more detail below). When adding providers and/or exporters, the provider or exporter must be registered with QC Image System 200. In order to register the new provider or exporter, the provider or exporter must conform to a corresponding protocol. In addition, if QC Image System 200 does not support a given image conversion, QC Image System 200 can be configured to support the conversion by adding a converter (as described in more detail below). When adding a converter, the converter must be registered with QC Image System 200. In order to register the new converter, the converter must conform to a corresponding protocol.

Figure 3:
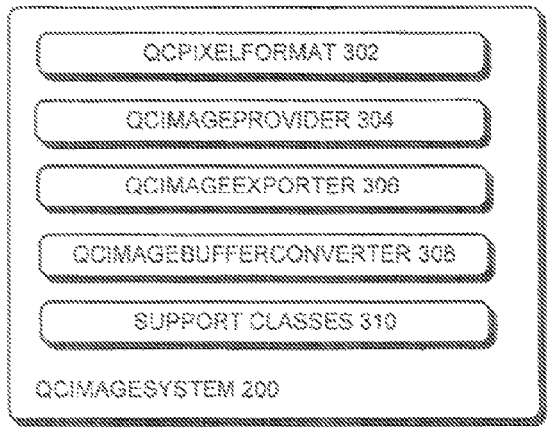
FIG. 3 presents a block diagram of the components of the QC Image System in accordance with embodiments of the present invention.

FIG. 3 presents a block diagram of the components of QC Image System 200 in accordance with embodiments of the present invention. QC Image System 200 includes extensible components QCPixelFormat 302, QCImageProvider 304, QCImageExporter 306, and QCImageBufferConverter 308. In addition, QC Image System 200 includes support classes 310.

QCPixelFormat 302 is a class that is used to describe pixel formats for images. For example, QCPixelFormat 302 can report the bit layout and/or the compatibility with various graphics APIs for a given image. QCImageProvider 304 and QCImageExporter 306 include a set of providers and exporters used to import and export images to and from QC Image System 200, respectively. QCImageBufferConverter 308 includes a set of converters used for image conversions.

Support Classes

Support classes 310 include the classes described in the following table.

TABLE 1

| Support Classes within QC Image System | |
|---|---|
| QCImagePixelBuffer | Provides a buffer of pixels in RAM (i.e., for the CPU) |
| QCImageTextureBuffer | Provides a buffer of pixels in VRAM (i.e., for the GPU) |
| QCCGLContext | Wraps objects in the OpenGL context and provides added functionalities (e.g., retrieving information and creating shared contexts) |
| QCRegion | Describes the 2D domain of definitions of images |
| QCResource/QCResourcePool | Implements the resource pools mechanism |
| QCCache | Handles all caching operations |

QCImageProvider

In some embodiments of the present invention, QC Image System 200 includes a number of image providers (interchangeably called "providers"). Providers can be created from various source image representation types and can output buffers CPU buffers or GPU buffers or both. For example, given an image representation, a provider can output a GPU buffer which contains pixels generated from the image representation. When generating buffers, providers can perform cropping, geometric transform, and color matching operations.

In some embodiments, QC Image System 200 includes the default image providers listed in the following table.

TABLE 2

| | Default Image Providers |
|---|---|
| CoreGraphics | Handles all image formats supported by ImageIO through URL, file path, or raw data, as well as CGImage, CGPath, CGLayer, and CGPDFDocument |
| CoreImage | Handles CIImage support |
| CoreText | Handles text rendering with simple attributes |
| CoreVideo | Handles CVImageBuffers support |
| NSImage | Handles NSImage and NSBitmapImageRep support |
| QCImageBuffer | Handles plain CPU or GPU buffers |

In addition to the default image providers, QC Image System 200 can be extended by registering new image providers. These new image providers are required to conform to the QCImageProvider 304 protocol for image providers within QC Image System 200. The following code section represents an embodiment of a QCImageProvider 304 protocol.

```
@protocol QCImageProvider
+ (BOOL) isCompatibleWithSource:(id)source
sourceMD5:(QCMD5*)md5; //If returning YES and md5 is not
NULL, you can set it to a MD5 representing the source for
caching purposes
+ (id<QCImageProvider>) createProviderWithSource:(id)source
options:(NSDictionary*)options;
- (QCMD5) providerMD5;
- (NSString*) sourceRepresentationType; //May be nil
- (id) sourceRepresentation; //Ignored if above is nil
- (QCRegion*) domainOfDefinition;
- (CGColor spaceRef) color space;
- (BOOL) hasAlpha;
- (QCPixelFormat*) nativePixelFormat; //May be nil, but if
not must be compatible with -color space
- (GLuint) nativeTextureTarget; //May be 0
- (BOOL) supportsCropping;
- (BOOL) supportsTransformation; //This requires cropping to
be supported
- (BOOL) supportsColorMatching; //This requires
transformation to be supported
- (NSArray*)
supportedPixelBufferFormatsForManager:(QCImageManager*)
manager; //NSArray of QCPixelFormats (nil = unsupported)
- (QCImagePixelBuffer*)
createPixelBufferForManager:(QCImageManager*)manager
withFormat:(QCPixelFormat*)format
transformation:(NSAffineTransform*)transformation
bounds:(NSRect)bounds color space:(CGColor spaceRef)color
space options:(NSDictionary*)options;
- (NSArray*)
supportedTextureBufferTargetsForManager:(QCImageManager*)
manager; //NSArray of NSNumbers (nil = unsupported)
- (NSArray*)
supportedTextureBufferFormatsForManager:(QCImageManager*)
manager; //NSArray of QCPixelFormats (nil = unsupported)
- (QCImageTextureBuffer*)
createTextureBufferForManager:(QCImageManager*)manager
withFormat:(QCPixelFormat*)format target:(GLenum)target
transformation:(NSAffineTransform*)transformation
bounds:(NSRect)bounds color space:(CGColor spaceRef)color
space options:(NSDictionary*)options;
@end
```

A provider implementation can be registered with QC Image System 200 using the following command:

+(void) registerImageProviderClass:(Class)class.

In some embodiments of the present invention, a provider can be called by a client as well as by QC Image System 200. In these embodiments, the client can call the provider to get CPU or GPU buffers and pass them to QC Image Manager 202.

QCImage

A QCImage is a wrapper around a QC Image Provider ("provider") that includes optional geometric transform and cropping operations. The QCImage is created by the provider to provide clients with a high level token that the can be moved between the clients and the components of QC Image System 200 (instead of moving the provider itself). In some embodiments, the QCImage includes metadata, which can be attached and retrieved by clients and components within the QC Image System.

```
@interface QCImage : QCObject
- (id) initWithProvider:(id<QCImageProvider>)provider
options:
(NSDictionary*)options;
- (id<QCImageProvider>) provider;
- (BOOL) isInfinite;
- (NSRect) bounds;
- (QCRegion*) domainOfDefinition;
- (NSAffineTransform*) transformation; //nil means identity
- (QCImagePixelBuffer*)
createPixelBufferForManager:(QCImageManager*)
manager withFormat:(QCPixelFormat*)format
bounds:(NSRect)bounds colorSpace:(CGColorSpaceRef)colorSpace
options:(NSDictionary*)options;
- (QCImageTextureBuffer*) createTextureBufferForManager:
(QCImageManager*)manager withFormat:(QCPixelFormat*)format
target:
(GLenum)target bounds:(NSRect)bounds
colorSpace:(CGColorSpaceRef) colorSpace
options:(NSDictionary*)options;
- (id) createRepresentationOfType:(NSString*)type
forManager:
(QCImageManager*)manager withOptions:(NSDictionary*)options;
- (id) initWithImage:(QCImage*)image; //Creates a virtual
copy and forwards metadata
- (QCImage*) createCroppedImageWithRect:(NSRect)rect;
- (QCImage*) createTranslatedImageByX:(CGFloat)dX
Y:(CGFloat)dY;
- (QCImage*) createScaledImageByX:(CGFloat)sX Y:(CGFloat)sY;
- (QCImage*) createScaledImageByX:(CGFloat)sX Y:(CGFloat)sY
fromX:
(CGFloat)oX Y:(CGFloat)oY;
- (QCImage*) createRotatedImageByDegrees:(CGFloat)r;
- (QCImage*) createRotatedImageByDegrees:(CGFloat)r
aroundX:(CGFloat) oX Y:(CGFloat)oY;
- (QCImage*)
createTransformedImage:(NSAffineTransform*)transformation;
- (void) setMetadata:(id)metadata forKey:(NSString*)key
shouldForward:
(BOOL)forward;
- (void) removeMetadataForKey:(NSString*)key;
- (void) removeAllMetadata;
- (id) metadataForKey:(NSString*)key;
- (void) forwardMetadataToObject:(QCObject*)object;
- (NSDictionary*) allMetadata;
- (NSDictionary*) allStaticMetadata;
- (NSDictionary*) allForwardedMetadata;
@end
```

The following call illustrates creating a QC Image from an unknown image representation type:

```
// from an unknown source (will scan all providers)
qcImage = [QCImage createImageWithSource:source options:nil]
```

In addition, some embodiments of the present invention allow the creation of a QCImage from image representations of a known type.

```
// from a file
qcImage = [[QCImage alloc] initWithFile:@"foo.jpg"
option:nil];
// or from CIImage
```

-continued

```
qcImage = [[QCImage alloc] initWithCIImage:ciImage
options:nil];
// from QCImageBuffer
qcImage = [[QCImage alloc] initWithQCImageBuffer:buffer
options:nil];
```

QCImageBufferConverter

In some embodiments of the present invention, QC Image System 200 includes a number of default image converters. These converters perform a number of different conversions on CPU and/or GPU buffers, such as pixel format conversion, cropping, geometric transforms, and color matching. For example, QC Image System 200 can include the converters listed in the following table.

TABLE 3

Default Image Converters

| | |
|---|---|
| Basic | Handles conversions from RAM (CPU) to VRAM (GPU) (with optional cropping) |
| CoreGraphics | Handles geometry transformations and color matching on the CPU |
| CoreImage | Handles geometry transformations and color matching on the CPU and GPU |
| GLImage | Handles any pixel format conversion supported by the GLImageLib on the CPU |
| OpenGL | Handles geometry transformations on the GPU |
| XRGB | Handles optimized conversions from XRGB to ARGB |
| YUV422 | Handles optimized conversions from YUV422 to RGB (with optional cropping) |

In addition to the default image converters, QC Image System 200 can be extended by registering new converters. These new converters are required to conform to the QCImageBufferConverter 308 protocol for converters within QC Image System 200. The following code section represents an embodiment of the QCImageBufferConverter 308 protocol.

```
@protocol QCImageBufferConverter
+ (id) converterForImageManager:(QCImageManager*)manager;
//WARNING: Don't retain "manager"
- (BOOL) supportsCropping;
- (BOOL) supportsTransformation; //This requires cropping to
be supported
- (BOOL) supportsColorMatching; //This requires
transformation to be supported
- (NSArray*)
supportedPixelBufferFormatsForFormat:(QCPixelFormat*)format;
//NSArray of QCPixelFormats
- (QCImagePixelBuffer*)
createPixelBufferFromImageBuffer:(QCImageBuffer*)buffer
withFormat:(QCPixelFormat*)format
transformation:(NSAffineTransform*)transformation
bounds:(NSRect)bounds color space:(CGColor spaceRef)color
space options:(NSDictionary*)options;
- (NSArray*)
supportedTextureBufferFormatsForFormat:(QCPixelFormat*)
format; //NSArray of QCPixelFormats
- (QCImageTextureBuffer*)
createTextureBufferFromImageBuffer:(QCImageBuffer*)buffer
withFormat:(QCPixelFormat*)format target:(GLenum)target
transformation:(NSAffineTransform*)transformation
bounds:(NSRect)bounds color space:(CGColor spaceRef)color
space options:(NSDictionary*)options;
@end
```

A converter implementation can be registered with QC Image System 200 using a command, such as the following command:

```
+ (void) registerImageConverterClass:(Class)class
priority:(double)p.
```

In some embodiments, QCImageManager 202 generates sequences of converters in order to make complex conversions. For example, assume a client requests an output image in color space B and with transformations C and D. Assuming that there are no converters that perform more than one of these conversions (e.g., a converter that can provide the image in color space B and with transformation D), QCImageManager 202 uses three separate converters to perform the image conversion. In cases such as this one, QCImageManager 202 determines which converters to use in which order to provide the output image taking into account performance and quality.

In some embodiments, when selecting a converter sequence to use to make a complex conversion, QCImageManager 202 models the performance of the possible converter sequences and the quality of the conversion from these converter sequences to determine the "cost" of using the path. QCImageManager 202 then uses the converter sequence with the lowest cost (i.e., the best performance and quality). During these determinations, performance can be determined by modeling the computational cost, speed, and number of transfers between CPU and GPU, while quality can be determined by modeling the number of pixel "touches" in the converter sequence.

QCImageExporter

In some embodiments of the present invention, QC Image System 200 includes a number of default image exporters. The image exporters generate an output image representation from a QCImage. For example, in some embodiments, QC Image System 200 includes the image exporters listed in the following table.

TABLE 4

Default Image Exporters

| | |
|---|---|
| CoreGraphics | Handles exporting CGImages and image formats as raw data, a file, or a URL through ImageIO |
| CoreImage | Handles exporting CIImages |
| CoreVideo | Handles exporting CVPixelBuffers and CVOpenGLBuffers |
| NSImage | Handles exporting NSImages and NSBitmapImageReps |

In addition to the default exporters, QC Image System 200 can be extended by registering new exporters. These new exporters are required to conform to the QCImageExporter 306 protocol for converters within QC Image System 200. The following code section represents an embodiment of the QCImageExporter 306 protocol.

```
@protocol QCImageExporter
+ (id) exporterForImageManager:(QCImageManager*)manager;
- (NSArray*) supportedRepresentationTypes;
- (id) createRepresentationOfType:(NSString*)type
withProvider:(id<QCImageProvider>)provider
transformation:(NSAffineTransform*)transformation
bounds:(NSRect)bounds color space:(CGColor spaceRef)color
space options:(NSDictionary*)options;
@end
```

A exporter implementation can be registered with QC Image System 200 using a command, such as the following command:

+(void) registerImageExporterClass:(Class)class.

The following call illustrates an exemplary call to export from a QCImage to another image representation type.

```
// Exporting a QCImage to a CGImage:
ciImage = [qcImage createRepresentationOfType:@"CGImage"
    forManager:manager withOption:nil];
```

In addition, some embodiments of the present invention allow the exportation of a QCImage to an image representation of a known type.

```
// Exporting a QCImage to a CGImage:
myImage = [qcImage createCGImageForManager:manager
    withOption:nil];
// Saving to disk:
myImage = [qcImage writeToFile:@"foo.jpg"].
```

In some embodiments of the present invention, the exporter can use an underlying image-processing library (or an image-processing application) to export the image for the client. For example, if a .JPG file is to be exported to a client, the exporter may call a method from a .JPG processing library.

QCImageManager

QCImageManager 202 handles buffer management, data conversion, uploads/downloads, and caching for QC Image System 200. The following code section represents an embodiment of QCImageManager 202.

```
@interface QCImageManager : NSObject
- (void) reclaimResources;
- (void) purgeResources;
//Creating a QCImage from an arbitrary source
- (QCImage*) createImageWithSource:(id)source
options:(NSDictionary*)options;
//Retrieving image buffers and representations from
providers
- (QCImagePixelBuffer*)
createPixelBufferFromProvider:(id<QCImageProvider>)provider
withFormat:(QCPixelFormat*)format
transformation:(NSAffineTransform*)transformation
bounds:(NSRect)bounds color space:(CGColor spaceRef)color
space options:(NSDictionary*)options;
- (QCImageTextureBuffer*)
createTextureBufferFromProvider:(id<QCImageProvider>)
provider withFormat:(QCPixelFormat*)format target:(GLenum)target
transformation:(NSAffineTransform*)transformation
bounds:(NSRect)bounds color space:(CGColor spaceRef)color
space options:(NSDictionary*)options;
- (id)
createRepresentationFromProvider:(id<QCImageProvider>)
provider ofType:(NSString*)type
withOptions:(NSDictionary*)options;
//Returns an image buffer ready to be written into
- (QCImagePixelBuffer*)
createPixelBufferWithFormat:(QCPixelFormat*)format
pixelsWide:(NSUInteger)width pixelsHigh:(NSUInteger)height
options:(NSDictionary*)options;
- (QCImageTextureBuffer*)
createTextureBufferWithFormat:(QCPixelFormat*)format
target:(GLenum)target pixelsWide:(NSUInteger)width
pixelsHigh:(NSUInteger)height
options:(NSDictionary*)options;
//Basic image buffer conversions
- (QCImagePixelBuffer*)
createPixelBufferFromImageBuffer:(QCImageBuffer*)buffer
sourceBounds:(NSRect)bounds options:(NSDictionary*)options;
//Pass NSZeroRect for entire buffer
- (QCImageTextureBuffer*)
createTextureBufferFromImageBuffer:(QCImageBuffer*)buffer
target:(GLenum)target sourceBounds:(NSRect)bounds
options:(NSDictionary*)options; //Pass NSZeroRect for entire
buffer and 0 for default target
//Complex image buffer conversions (through
QCImageBufferConverters)
- (QCImagePixelBuffer*)
createPixelBufferFromImageBuffer:(QCImageBuffer*)buffer
withFormat:(QCPixelFormat*)format
transformation:(NSAffineTransform*)transformation
bounds:(NSRect)bounds color space:(CGColor spaceRef)color
space options:(NSDictionary*)options; //Pass nil for default
format, nil for no transformation, NULL to preserve color
space and NSZeroRect to preserve bounds
- (QCImageTextureBuffer*)
createTextureBufferFromImageBuffer:(QCImageBuffer*)buffer
withFormat:(QCPixelFormat*)format target:(GLenum)target
transformation:(NSAffineTransform*)transformation
bounds:(NSRect)bounds color space:(CGColor spaceRef)color
space options:(NSDictionary*)options; //Pass nil for default
format, 0 for default target, nil for no transformation,
NULL to preserve color space and NSZeroRect to preserve
bounds
//Creating a flattened version of a QCImage
- (QCImage*)createFlattenedImage:(QCImage*)image
withFormat:(QCPixelFormat*)format color space:(CGColor
spaceRef)color space options:(NSDictionary*)options; //Pass
nil for default pixel format
@end
```

Interfaces

The following code sections represent embodiments of various interfaces for QC Image System 200. These interfaces facilitate registering provider classes, converter classes, and exporter classes with QC Image System 200. Note that each registered class must conform to the corresponding protocol. For example, a registered provider must correspond to the QCImageProvider 304 protocol (as described above).

```
@interface QCImage (ProviderRegistry)
+ (void) registerImageProviderClass:(Class)aClass; //Class
must conform to <QCImageProvider> protocol
+ (NSArray*) imageProviderClasses;
@end
@interface QCImage (ExporterRegistry)
+ (void) registerImageExporterClass:(Class)aClass; //Class
must conform to <QCImageExporter> protocol
+ (NSArray*) imageExporterClasses;
@end
@interface QCImageManager (ConverterRegistry)
+ (void) registerImageBufferConverterClass:(Class)aClass
priority:(float)priority; //Class must conform to
<QCImageBufferConverter> protocol - The higher the priority
the better the chance to be used
+ (NSArray*) imageBufferConverterClasses;
@end
```

Processing Images

The following section presents processes for converting an image using QC Image System 200 in accordance with embodiments of the present invention. Note that although we present the steps in the following process in a particular order for the purposes of illustration, in alternative embodiments, the steps may occur in another order or one or more of the steps may be skipped.

Figure 4:
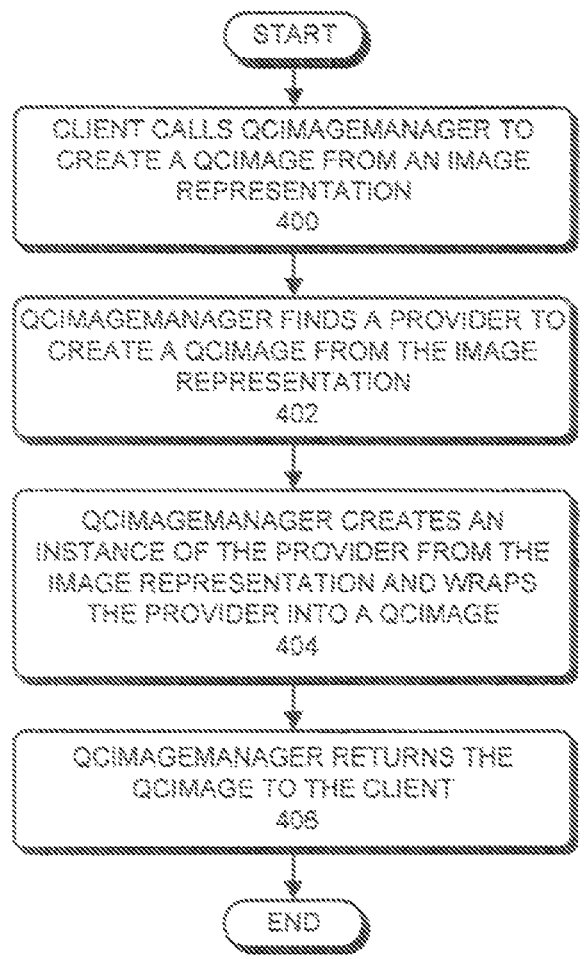
FIG. 4 presents a flowchart illustrating the process of creating a QCImage in accordance with embodiments of the present invention.

FIG. 4 presents a flowchart illustrating the process of creating a QCImage from an image representation in accordance with embodiments of the present invention. The QCImage is a high-level token that can subsequently be passed between the client and the components in QC Image System 200 during an image conversion process.

The process starts when a client calls QCImageManager 202 to create a QCImage from an image representation (step 400). For example, the client can call QCImageManager 202 to create a QCImage from a file on disk.

QCImageManager 202 then finds a provider to create a QCImage from the image representation (step 402). If there is no provider available that is capable of creating the QCImage from the image representation or if the request is erroneous, QCImageManager 202 signals the client that the operation failed.

Otherwise, QCImageManager 202 creates an instance of the provider from the image representation and wraps the provider into a QCImage (step 404). QCImageManager 202 then returns the QCImage to the client (step 406).

Note although we present the creation of the QCImage as a separate process from the following processes (i.e., the processes in FIGS. 5-7), in alternative embodiments, the process of generating a QCImage from the image representation is part of the processes. In other words, the client can call QC Image Manager 202 once with an image representation and QC Image Manager 202 can complete the process without passing the QCImage back to the client and requiring the client to make another call to QC Image Manager 202.

Figure 5:
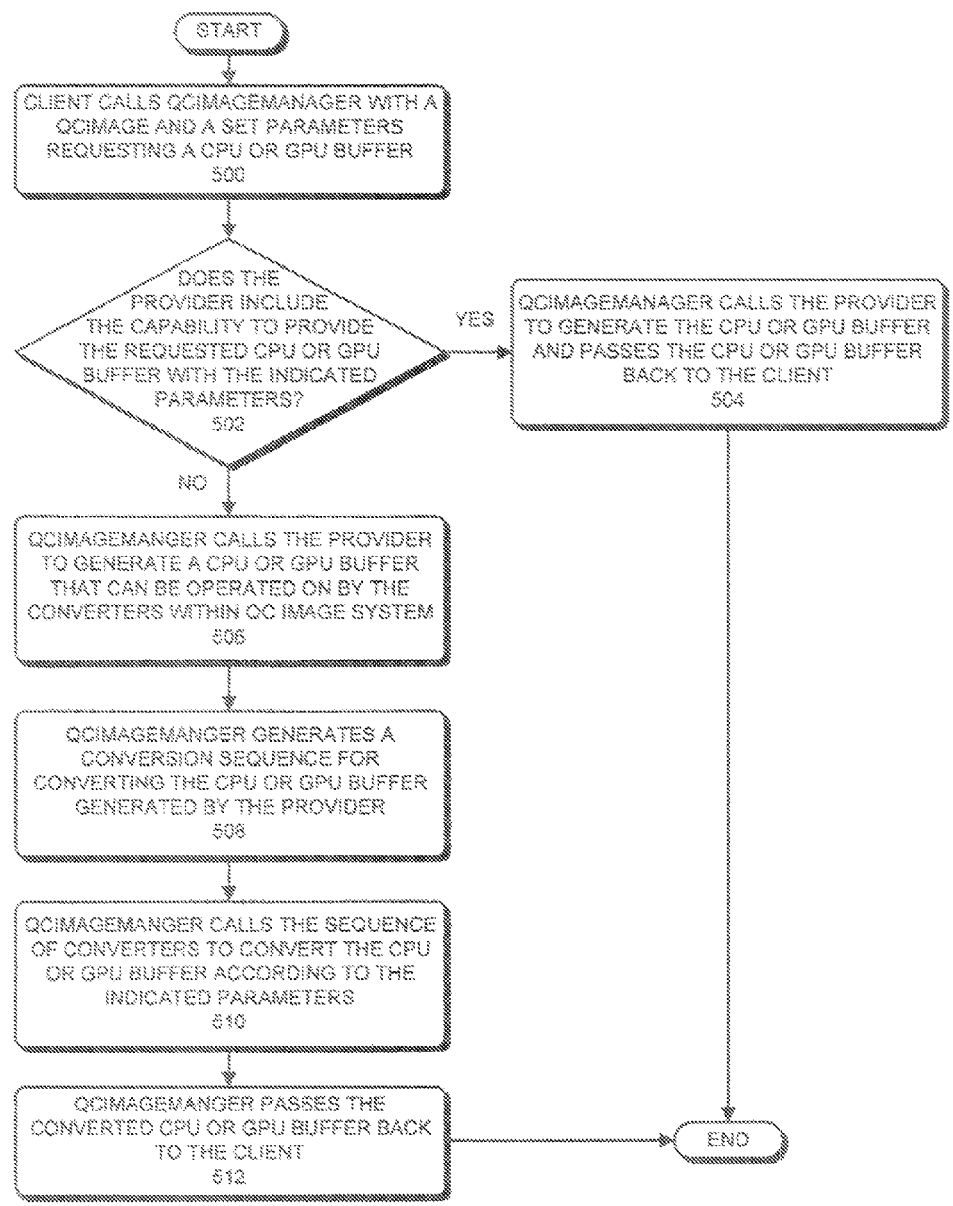
FIG. 5 presents a flowchart illustrating the process of creating a pixel buffer from an image representation in accordance with embodiments of the present invention.

FIG. 5 presents a flowchart illustrating the process of creating a pixel buffer from a QCImage in accordance with embodiments of the present invention. A pixel buffer can be any buffer in memory that contains a concrete representation of an image, however, for the purposes of illustration, we refer to a "CPU or GPU buffer."

The process starts when a client calls QCImageManager 202 with a QCImage and a set of parameters requesting a CPU or GPU buffer (step 500). For example, when requesting the CPU or GPU buffer, the client can request a buffer containing the pixels of the image representing the entire image or a sub-region of the image in a given pixel format and color space, and with an optional transformation applied (e.g., a rotation of 90 degrees).

QCImageManager 202 then determines if the provider wrapped within the QCImage includes the capability to provide the CPU or GPU buffer with the indicated parameters (step 502). If the provider includes the capability, then QCImageManager 202 calls the provider to generate the CPU or GPU buffer and passes the CPU or GPU buffer back to the client (step 504). Otherwise, if the provider does not include the capability, QCImageManger 202 calls the provider to generate a CPU or GPU buffer that can be operated on by converters within QC Image System 200 (step 506).

QCImageManager 202 then builds a converter sequence for converting the CPU or GPU buffer generated by the provider (step 508). QCImageManager 202 builds the converter sequence from the registered converters within QC Image System 200. Building the converter sequence can fail where the converter sequence is impossible to build (i.e., where the requested outcome is impossible to create, etc.) or where there is no registered converter that performs the operation. If QCImageManager 202 is unable to build the converter sequence, the image conversion process fails and an error message is sent to the client.

QCImageManager 202 then calls the sequence of converters to convert the CPU or GPU buffer according to the indicated parameters (step 510). Next, QCImageManager 202 passes the converted CPU or GPU buffer back to the client (step 512).

Figure 6A:
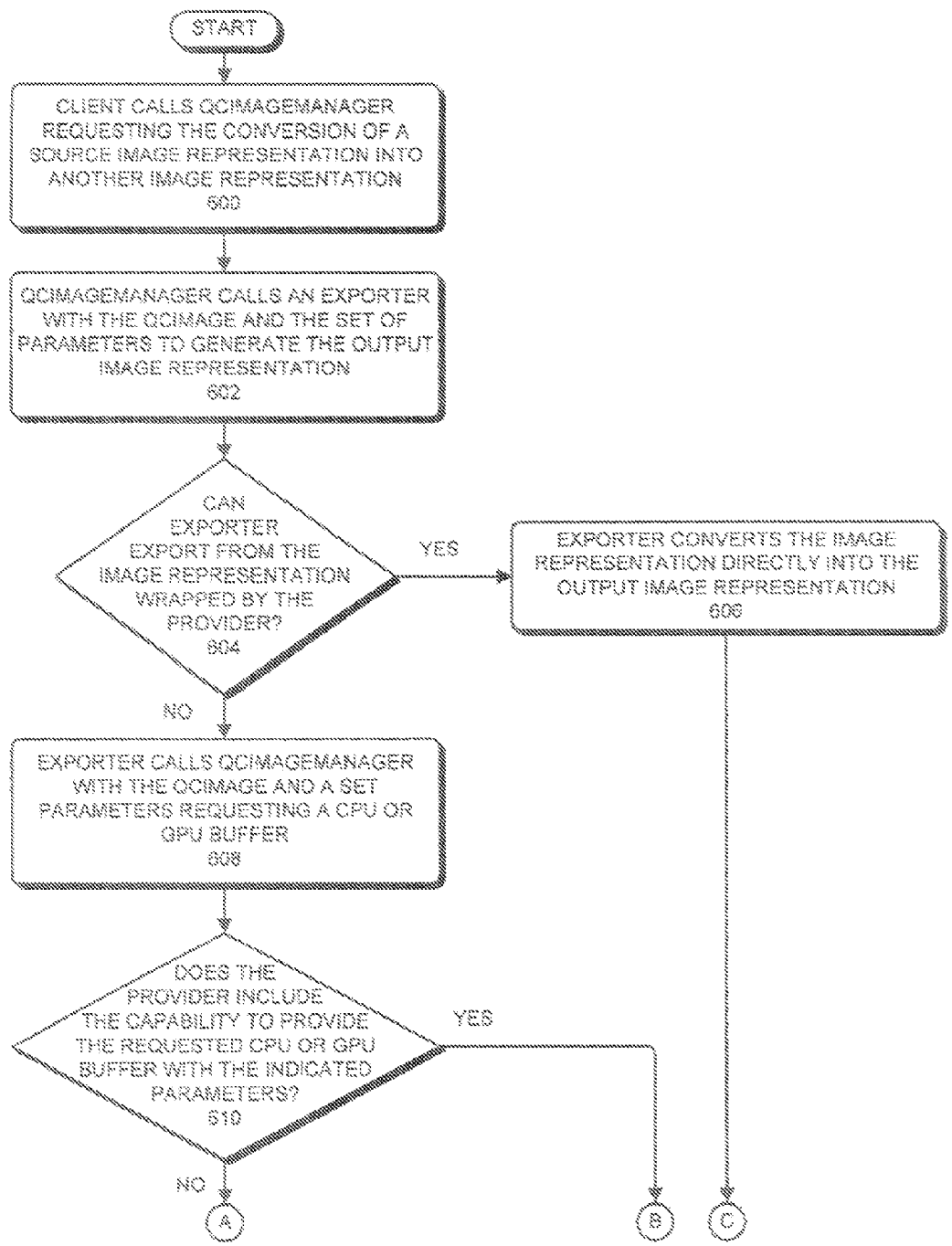
FIG. 6A through 6B present a flowchart illustrating the process of generating a second image representation from a first image representation in accordance with embodiments of the present invention.
Figure 6B:
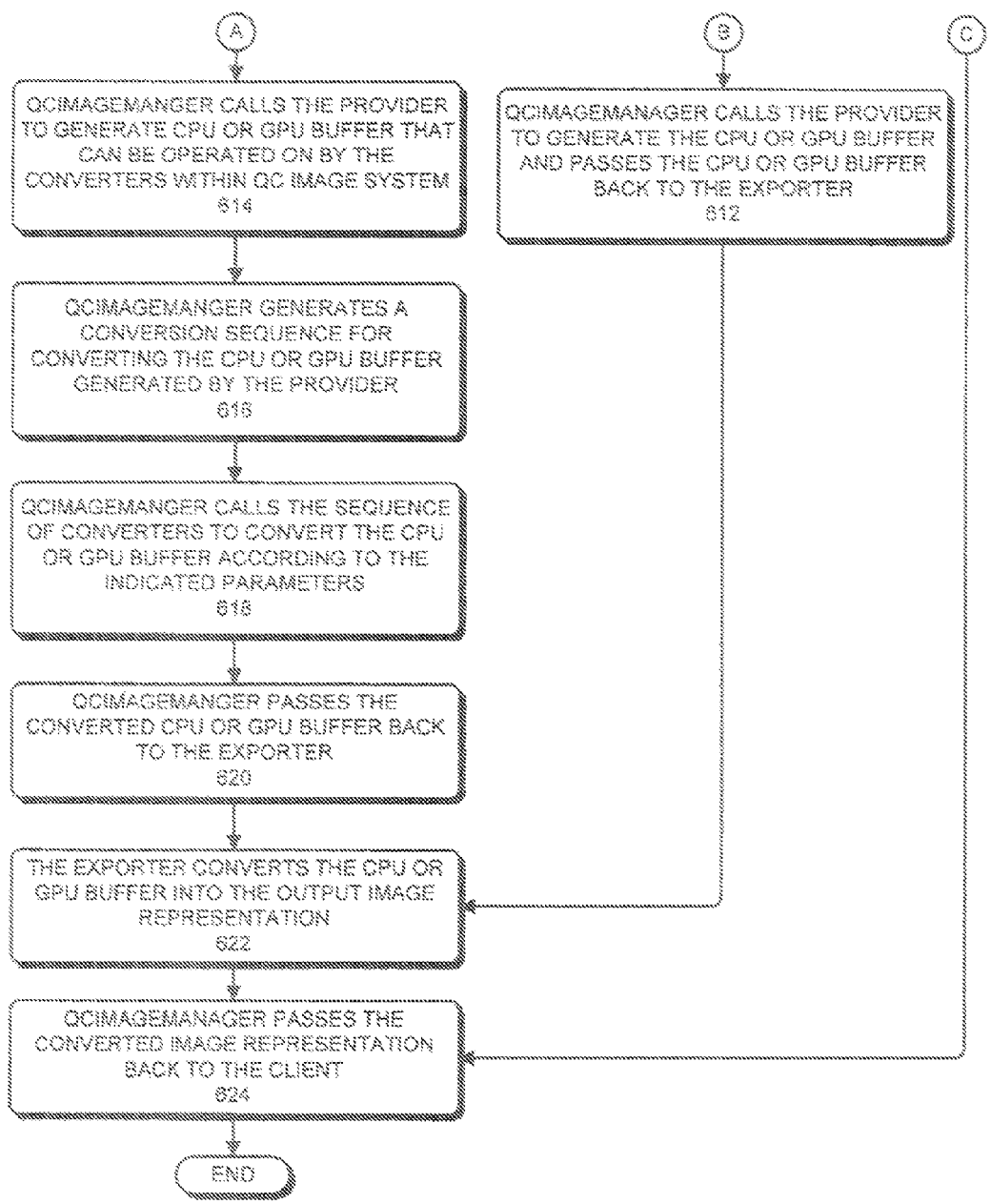

FIG. 6A through 6B present a flowchart illustrating the process of generating a second image representation from a first image representation in accordance with embodiments of the present invention. For the purposes of illustration, we call the first image representation the "source."

The process starts when a client calls QCImageManager 202 and requests the conversion of a source image representation into another type of image representation (step 600). For example, the client could request the conversion of an image representation type such as a frame of video into a still image. When calling QCImageManager 202, the client passes the QCImage and an (optional) set of parameters. Note that although the set of parameters is optional, we assume for the purposes of illustration that a set of parameters is passed to QCImageManager 202 by the client along with the QCImage.

QCImageManager 202 calls an exporter with the QCImage and the set of parameters to generate the output image representation (step 602). If there is no registered exporter that can generate the output image representation, the image conversion process fails and an error message is sent to the client.

QCImageManager 202 determines if the exporter can export from the image representation wrapped by the provider (step 604). For example, some exporters can generate the export image representation from the underlying source of the provider. If the exporter can export from the image representation, the exporter converts the image representation directly into the output image representation (step 606). Next, QCImageManager 202 passes the converted image representation back to the client (step 624).

Otherwise, if the exporter can not export from the image representation wrapped by the provider, the exporter calls back to QCImageManager 202 with the image representation and a set of parameters requesting a CPU or GPU buffers (step 608). For example, the exporter can request a CPU or GPU buffers containing the pixels of the image representing the entire image or a sub-region of the image in a given pixel format and color space and with an optional geometric transformation applied (for instance a rotation of 90 degrees). Note that the exporter could also request more than one CPU or GPU buffer, depending on the output file format.

QCImageManager 202 then determines if the provider wrapped within the QCImage includes the capability to provide the CPU or GPU buffers with the indicated parameters (step 610). If the provider includes the capability, then QCImageManager 202 calls the provider to generate the CPU or GPU buffer and passes the CPU or GPU buffer back to the exporter (step 612). Otherwise, if the provider does not include the capability, QCImageManger 202 calls the provider to generate a CPU or GPU buffer that can be operated on by converters within QC Image System 200 (step 614).

QCImageManager 202 then builds a converter sequence for converting the CPU or GPU buffer generated by the provider (step 616). QCImageManager 202 builds the converter sequence from the registered converters within QC Image System 200. Building the converter sequence can fail where the converter sequence is impossible to build (i.e., where the requested outcome is impossible to create, etc.) or where there is no registered converter that performs the operation. If QCImageManager 202 is unable to build the converter sequence, the image conversion process fails and an error message is sent to the client.

QCImageManager 202 then calls the sequence of converters to convert the CPU or GPU buffer according to the indicated parameters (step 618). Next, QCImageManager 202 passes the converted CPU or GPU buffer back to the exporter (step 620).

The exporter then converts the CPU or GPU buffer(s) into the output image representation (step 622). Next, QCImageManager 202 passes the converted image representation back to the client (step 624).

QCCache

QCCache is the class responsible for handling caching operations within QC Image System 200. The following code section presents a protocol for QCCache in accordance with embodiments of the present invention.

```
typedef float (*QCCacheFilteringFunction)(id resource,
QCMD5* md5List, void* userInfo);
typedef void (*QCCacheUserInfoReleaseCallback)(void*
userInfo);
@protocol QCCache
//Intitialization
- (id) initWithMaximumSize:(double)size
maximumResourceAge:(NSTimeInterval)age
options:(NSDictionary*)options;
//Manipulating resources
- (void) addResource:(id)resource withSize:(double)size
cost:(double)cost md5List:(QCMD5*)list
count:(NSUInteger)count;
- (void) removeResource:(id)resource;
- (void) removeAllResources;
//Garbage collection
- (void) collectResources;
//Filtering the cache
- (id<QCCache>) subcacheMatchingMd5List:(QCMD5*)md5List
forIndices:(NSUInteger*)indices count:(NSUInteger)count;
- (id<QCCache>) subcacheUsingFilteringFunction:
(QCCacheFilteringFunction)function userInfo:(void*)userInfo
userInfoReleaseCallback:(QCCacheUserInfoReleaseCallback)call
back;
//Extracting resources
- (id) copyBestResource:(float*)outMatch; //Can be NULL
- (id) copyAnyResource;
- (NSArray*) copyAllResources;
@end
```

In some embodiments of the present invention, QCCache maintains a tree-based caching structure. The lowest level of the tree-based caching structure includes a root cache, which holds a set of resource addresses. Along with the resources addresses, the root cache can hold MD5 keys and a size value associated with each addressed resource. A hierarchy of subcaches (children) descends from the root cache, wherein each child subcache in the hierarchy holds a filtered subset of the resource addresses (and MD5 keys/size values) in the root cache.

Note that neither the root cache nor any subcaches (i.e., the "caches") hold the resources. The resources are stored in memory or on disk. The caches hold only an indicator (e.g., a pointer or some form of reference) of the address of the resources in memory and some information about the resource.

In some embodiments, resource addresses held in the caches are associated with image representations. For example, a subcache may be populated with addresses for image representations that have undergone a given conversion. Alternatively, a subcache may be populated with addresses for image representations that are a given size on disk.

Queries

The type of resources whose resource addresses are included in a given cache can be determined using a query on the cache. For example, assuming that a cache includes a set of resources addresses, some of the resource addresses indicating resources with property X and others indicating resources with property Y, QCCache can perform a query on the cache to determine which of the addressed resources have property X.

In some embodiments of the present invention, there are two forms of query; the filtering query, which filters the resources addresses in the parent cache for a given subcache, and the resource query, which attempts to find one or more qualifying resources from the resource addresses in a given cache.

In some embodiments of the present invention, when a filtering query is applied to a given cache, QCCache returns a new subcache instead of returning the matching resource addresses. This operation adds a new subcache descending from the queried cache in the tree of caches. (The operation of adding a new subcache and the situations where a filtering query is performed on the parent cache to populate the subcache are described in more detail below.)

One type of filtering query uses MD5 keys generated from the resources to perform the filtering (using the subcacheMatchingMd5List protocol above). On the other hand, another type of filtering query includes a filtering function defined by a user (using the subcacheUsingFilteringFunction protocol above). The filtering function defined by the user can use the resource addresses in a given cache to look up an actual resource to determine if the resource matches any qualifications in the filtering function.

In some embodiments, the filtering query returns a score between 0 and 1 representing the closeness of the match between a given resource and the filter (the higher the number the closer the match).

In some embodiments of the present invention, the resource addresses in each subcache can be queried to find available resources using one of the "copyAnyResource," "copyBestResource," or "copyAllResouces" resource queries. The copyAnyResource resource query returns the first resource address for a resource that matches all the filters above the subcache in the cache hierarchy, while the copyBestResource resource query returns the resource address for the resource with the best "score," and the copyAllResources resource query returns all resource addresses available in the subcache.

Generation of New Subcaches

In some embodiments of the present invention, when a filtering query is applied to a given cache, QCCache returns a new subcache instead of returning the matching resource addresses. This operation adds a new subcache descending from the queried cache in the tree of caches (which is associated with the filtering function).

Each newly added subcache potentially benefits from filtering queries applied to the caches above the subcache in the hierarchy. In other words, as new subcaches are added to the hierarchy beneath it, a parent subcache may not need to reevaluate the filtering queries against all resource addresses in the caches above the parent subcache in the hierarchy, because some or all of the work has already been done in another child's subcache filtering query.

The subcaches created in response to a filtering query are not immediately populated by the filtered resource addresses of the parent cache. In other words, the subcache is created, but the filtering query is not run on the parent cache. Instead, the filtering query is run on the parent cache (and the subcache is populated by the filtered resource addresses) when a resource query is applied to the subcache (which we call "lazy" evaluation of the filtering query).

Consequently, the way that a subcache gets populated depends on the type of resource query that eventually causes the population of the subcache. For example, the copyAnyResource query evaluates resources for resource addresses in the parent cache until the first resource address is found that matches the resource query. Hence, only one resource address is populated in the subcache. On the other hand, the copyBestResource and the copyAllResources queries evaluate all of the resources for resource addresses in the parent cache, thereby fully populating the subcache.

A resource query applied to a subcache can cause filtering queries to be applied to each parent cache within the tree structure. A resource query to the subcache can therefore populate the parent caches, speeding up later resource queries applied to them.

Figure 7:
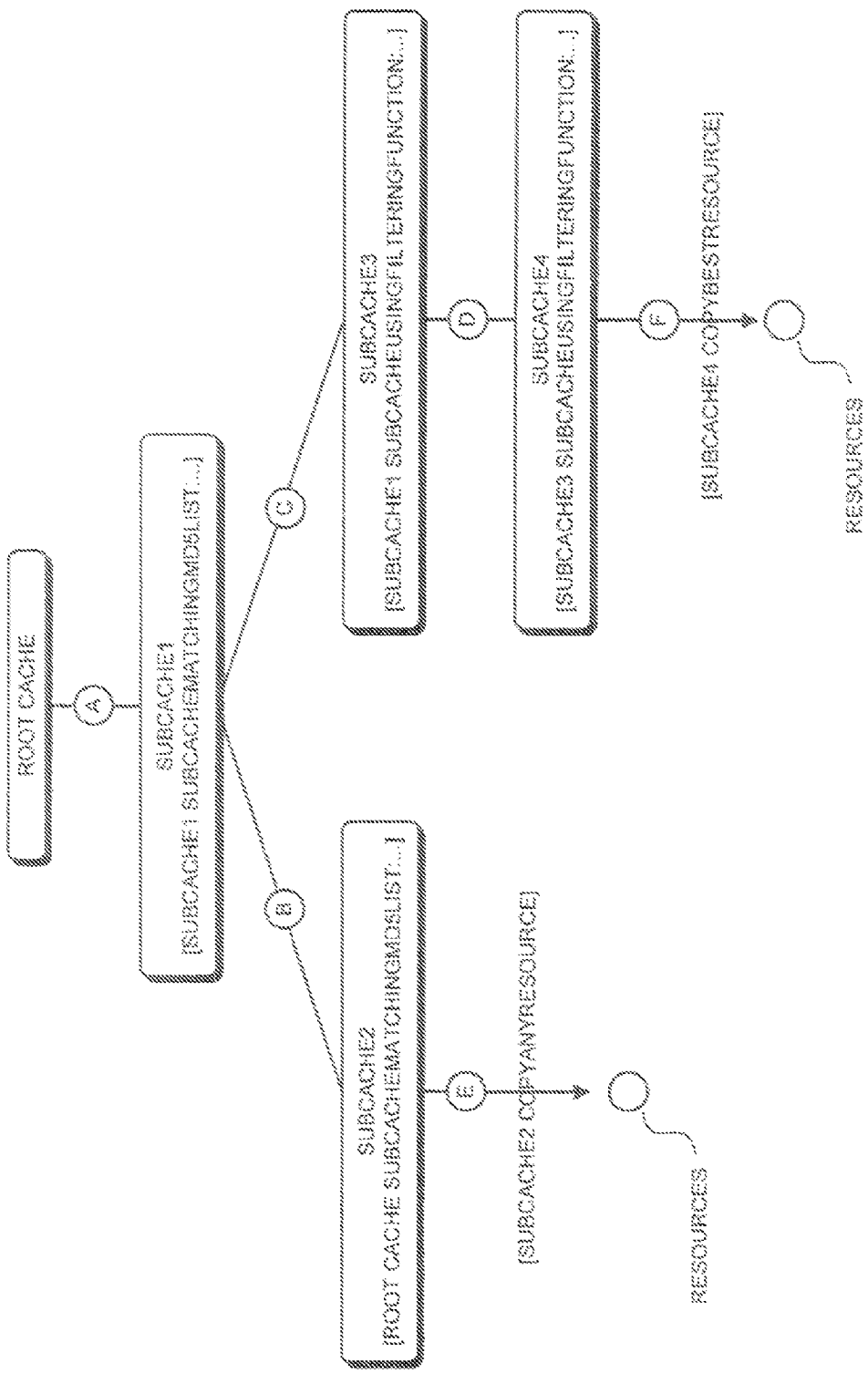
FIG. 7 presents a block diagram illustrating the propagation of queries in a cache hierarchy in accordance with embodiments of the present invention.

FIG. 7 presents a block diagram illustrating the propagation of queries in a cache hierarchy in accordance with embodiments of the present invention. Within the block diagram, the encircled letters (such as "B") represent either filtering queries or resource queries. For example, resource query F is a copyBestResource query on subcache2.

Recall that a filtering query (such as filtering query B) initially only adds an empty subcache to the cache hierarchy. The filtering function is not run (and the subcache is not populated) until a resource query is run on the cache or on one of the associated child subcaches. Furthermore, the eventual population of the subcache and any intervening subcaches depends on the nature of the resource query and not on the nature of any associated filtering queries.

In FIG. 7, filtering queries A and B are subcacheMatchingMd5List queries, which, if completed, populate a child with all resource addresses present in the parent cache which match an MD5 pattern (as defined within the queries). However, resource query E is a copyAnyResource query, which halts the performance of filtering queries A and B, and therefore the population of subcache 1 and subcache2, as soon as any resource address is found for a resource that matches filtering query B. Hence, after resource query E, subcache2 contains only one resource address, but subcache1 contains the one resource address along with the other resources addresses from the root cache that were encountered that satisfy filtering query A but not filtering query B.

Queries applied to parent subcaches (and their children) benefit from queries applied to children subcaches. For example, assuming that there is at least one resource address that matches filtering queries A and B in the root cache, after resource query E, subcache1 is guaranteed to have at least one resource address. Hence, a copyAnyResource query applied to subcache1 returns immediately (i.e., without evaluating filtering query A).

Similarly, after resource query F is sent, subcache1, subcache 3, and subcache 4 are fully populated, so that any resource query applied to any of these subcaches does not require the reevaluation of any filtering query against the resources addresses in the root cache or any parent cache(s). Moreover, if resource query E is sent after resource query F, only filtering query B needs to be evaluated, and not filtering query A.

Synchronization

In some embodiments of the present invention, subcaches are kept "synchronized" with their parent cache(s). Hence, adding a resource address to the root cache may eventually be reflected in the subcaches. This synchronization is performed in a lazy manner (similar to the original population of a given subcache). In other words, the filtering query to populate a given subcache is not re-performed until a resource query is applied to the subcache or a child of the subcache. In this way, the system avoids unnecessarily updating resource addresses in a subcache that are not being used.

Caches within the Image-Processing System

Figure 8:
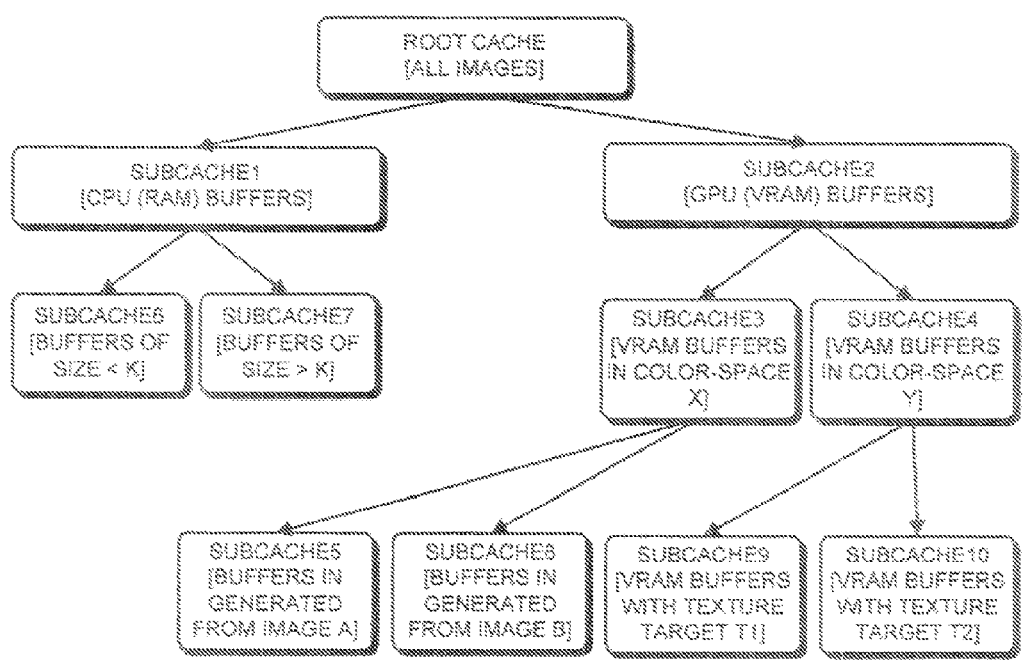
FIG. 8 presents a block diagram illustrating a caching structure in an image-processing system in accordance with embodiments of the present invention.

FIG. 8 presents a block diagram illustrating a caching structure in an image-processing system in accordance with embodiments of the present invention. The caching structure in FIG. 8 is comprised of 3 levels of hierarchy descending from a root cache. Note that we refer to the combination of resource addresses, MD5 tags, and size values as identifiers for the sake of clarity.

We assume that the root cache contains a separate identifier for each image in a set of images operated on by QC Image System 200 that may be present in memory or on disk. Note that only the identifiers, and not images themselves, are stored within the root cache.

At the first level of the hierarchy, two subcaches descend from the root cache. Subcache1 includes identifiers for images which are stored in the CPU (RAM) buffers, while the other subcache2 includes identifiers for images that are stored in the GPU (VRAM) buffers. A hierarchy of subcaches beneath subcache1 and subcache2 includes filtered versions of the identifiers in subcache1 and subcache2.

Recall that some embodiments of the present invention perform lazy evaluation of filtering queries. That is, until a resource query is made on a subcache in the hierarchy, the filtering queries that populate the subcaches are not performed. Hence, some or all of the subcaches in the hierarchy in FIG. 6 may be instantiated but unpopulated.

Garbage Collection

In some embodiments of the present invention, QCCache supports a garbage-collection operation that can be used to remove excess or unused resources from the cache or a subcache. For example, the collectResources function (from the QCCache protocol above) can be called to remove unused resources from subcache1 and subcache2 in FIG. 6. Note that garbage collection can be skipped for the subcaches of subcache1 and subcache2, because these caches are synchronized with subcache1 and subcache2.

Purgeable Resources in the Subcaches

In some embodiments of the present invention, each subcache is initialized with a maximum size value and a maximum resource age value (i.e., the "maximumResourceAge" and "initWithMaximumSize" values in the subcache initialization function in the QCCache protocol above). The maximum size value limits the size of a given subcache, while the maximum resource age limits the age of resources included in the subcache. These limits are used by QCCache to prevent the subcache becoming too large and to prevent the resources held in the subcache from becoming stale.

In addition to the maximumResourceAge, each subcache includes a maximum age. The maximumResourceAge and the maximum age are used together combination to limit the ages of resources maintained by QCCache in memory.

In some embodiments, the maximum age is the age limit for a resource at which the resource is discarded, whereas the maximumResourceAge is the age limit for a resource at which the resource becomes "purgeable." When a resource is purgeable, the resource address is maintained in the subcache and the resource is maintained in the memory unless the system needs to use the memory being occupied by the resource. If the system needs the memory being occupied by the resource, the system determines if the resource is purgeable (e.g., by looking at the status of the indicator for the resource in the subcache containing the resource address), and, if so, discards the resource, thereby freeing the memory. However, purgeable resources can still be used by QC Image System 200 until they are discarded by the system.

For example, assume a subcache with a maximumResourceAge of 0.1 s and a maximum age of 1 s. In this case, the resource address in a given subcache is marked as purgeable after the resource address has been in the cache for 0.1 s. Hence, if the system does not require the address space until 0.7 s, the resource address remains in the subcache (and the underlying resource remains in the memory) for 0.6 s in the purgeable state. In other words, the resource is available for the QC Image System 200 to use for 0.6 s, but does not otherwise prevent the system from using the memory. At the maximum age limit of 1 s, the resource address is removed from the subcache.

Recall that in some embodiments of the present invention, child caches of a given subcache are lazily synchronized with the given subcache, so that removal of a resource from the subcache can eventually be propagated to child subcaches.

Dynamic Adjustment of maximumResourceAge

In some embodiments of the present invention, QCCache dynamically adjusts the maximumResourceAge. In order to make the adjustment, QCCache monitors the age of resources that are returned in response to a resource or filtering query. Then, based on a statistical profile the ages of the returned resources, QCCache adjusts the maximum resource age.

Because resources can remain in the cache beyond the maximumResourceAge, the resources are available for return from resource or filtering queries that occur after their age has surpassed the maximumResourceAge. Hence, QCCache can detect the later return of the resource in response to a resource or filtering query and, based on the ages of the returned resources, QCCache can more accurately adjust the maximum resource age.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method, comprising:
   in response to applying a filtering query to a parent cache in a cache tree structure, generating a new subcache descending from the parent cache without including resource addresses; and
   populating the new subcache with one or more resource address from the parent cache based on results of a resource query applied to the new subcache.

2. The method of claim 1, further comprising receiving a request for a list of addresses of images, wherein the images have at least one property in common.

3. The method of claim 2, wherein the common property includes at least one of being stored in a given location, being stored in a given format, having undergone an image modification, exceeding or not exceeding a bound, or exceeding or not exceeding a given size in memory.

4. The method of claim 1, wherein generating the new subcache includes indicating a maximum size allowed for the new subcache, a maximum age and a purgeable age for identifiers for images in the new subcache.

5. The method of claim 4, further comprising:
   removing an identifier for an image from the parent cache if the identifier for the image is older than a maximum age, wherein removing the identifier for the image involves removing the underlying image from a memory location;
   marking the identifier for the image as purgeable if the identifier for the image is older than the purgeable age; and
   wherein when the identifier for the image is marked as purgeable, the method further comprises removing the associated image from the memory location if the location in memory is required for another purpose.

6. The method of claim 5, further comprising:
   computing a statistical profile for the ages of resources returned from a given subcache in response to a resource query or filtering query using the statistical profile to compute a purgeable age; and
   updating the purgeable age with the computed purgeable age.

7. The method of claim 1, further comprising performing a garbage-collection operation to remove excess or unused resources from the parent cache as purgeable if those resources are over a purgeable age.

8. An apparatus for performing caching in an image-processing system, comprising:
   memory configured to store a cache tree structure
   one or more processors configured to:
      in response to applying a filtering query to a parent cache in the cache tree structure, generate a new subcache descending from the parent cache without including resource addresses; and
      populate the new subcache with one or more resource address from the parent cache based on results of a resource query applied to the new subcache.

9. The apparatus of claim 8, further comprising receiving a request for a list of addresses of images, wherein the images have at least one property in common.

10. The apparatus of claim 9, wherein the common property includes at least one of being stored in a given location, being stored in a given format, having undergone an image modification, exceeding or not exceeding a bound, or exceeding or not exceeding a given size in memory.

11. The apparatus of claim 8, wherein the processors configured to generate the new subcache includes indicating a maximum size allowed for the new subcache, a maximum age and a purgeable age for identifiers for images in the new subcache.

12. The apparatus of claim 11, the processors further configured to:
   remove an identifier for an image from the parent cache if the identifier for the image is older than a maximum age, wherein removing the identifier for the image involves removing the underlying image from a memory location;
   mark the identifier for the image as purgeable if the identifier for the image is older than the purgeable age; and
   wherein when the identifier for the image is marked as purgeable, the processors further configured to remove the associated image from the memory location if the location in memory is required for another purpose.

13. The apparatus of claim 12, processors further configured to:
   compute a statistical profile for the ages of resources returned from a given subcache in response to a resource query or filtering query using the statistical profile to compute a purgeable age; and
   update the purgeable age with the computed purgeable age.

14. A computer program product encoded on a tangible, non-transitory storage medium, the product comprising computer readable instructions for causing one or more processors to perform operations comprising:
   in response to applying a filtering query to a parent cache in a cache tree structure, generating a new subcache descending from the parent cache without including resource addresses; and populating the new subcache with one or more resource address from the parent cache based on results of a resource query applied to the new subcache.

15. The computer program product of claim 14, the instructions further comprising receiving a request for a list of addresses of images, wherein the images have at least one property in common.

16. The computer program product of claim 15, wherein the common property includes at least one of being stored in a given location, being stored in a given format, having undergone an image modification, exceeding or not exceeding a bound, or exceeding or not exceeding a given size in memory.

17. The computer program product of claim 14, wherein the instructions comprising generating the new subcache includes indicating a maximum size allowed for the new subcache, a maximum age and a purgeable age for identifiers for images in the new subcache.

18. The computer program product of claim 17, the instructions further comprising:
- removing an identifier for an image from the parent cache if the identifier for the image is older than a maximum age, wherein removing the identifier for the image involves removing the underlying image from a memory location;
- marking the identifier for the image as purgeable if the identifier for the image is older than the purgeable age; and
- wherein when the identifier for the image is marked as purgeable, the instructions further comprising removing the associated image from the memory location if the location in memory is required for another purpose.

* * * * *